United States Patent
Chawan et al.

(10) Patent No.: US 11,182,783 B2
(45) Date of Patent: Nov. 23, 2021

(54) ELECTRONIC PAYMENT METHOD AND ELECTRONIC DEVICE USING ID-BASED PUBLIC KEY CRYPTOGRAPHY

(71) Applicant: SAMSUNG ELECTRONICS CO., LTD., Suwon-si (KR)

(72) Inventors: Parashuram Chawan, Surrey (GB); Paulo Sergio Alves Martins, Lisbon (PT)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 314 days.

(21) Appl. No.: 16/091,838

(22) PCT Filed: Aug. 22, 2016

(86) PCT No.: PCT/KR2016/009224
§ 371 (c)(1),
(2) Date: Oct. 5, 2018

(87) PCT Pub. No.: WO2017/175926
PCT Pub. Date: Oct. 12, 2017

(65) Prior Publication Data
US 2019/0139039 A1 May 9, 2019

(30) Foreign Application Priority Data

Apr. 5, 2016 (GB) .................................... 1605829
Aug. 19, 2016 (KR) ........................ 10-2016-0105583

(51) Int. Cl.
*G06Q 20/38* (2012.01)
*G06Q 20/02* (2012.01)
(Continued)

(52) U.S. Cl.
CPC ....... *G06Q 20/3829* (2013.01); *G06Q 20/027* (2013.01); *G06Q 20/20* (2013.01);
(Continued)

(58) Field of Classification Search
CPC ............. G06Q 20/3829; G06Q 20/409; G06Q 20/3227; G06Q 30/0238; G06Q 20/32;
(Continued)

(56) References Cited

U.S. PATENT DOCUMENTS 5,590,197 A * 12/1996 Chen .................... G06Q 20/04
380/30
6,094,485 A * 7/2000 Weinstein ............. H04L 63/105
380/30

(Continued)

FOREIGN PATENT DOCUMENTS

JP 2002-514839 A 5/2002
JP 2009-526321 A 7/2009
(Continued)

OTHER PUBLICATIONS

Communication dated Jan. 15, 2019, issued by the European Patent Office in counterpart European Application No. 16898030.8.
(Continued)

*Primary Examiner* — Johann Y Choo
(74) *Attorney, Agent, or Firm* — Sughrue Mion, PLLC

(57) ABSTRACT

Provided are an electronic payment method and an electronic device using identity-based public key cryptography. The electronic payment method includes receiving, from a key management service (KMS) server that stores personal information of a user, a private key of the user generated according to an Identity-based public key cryptography (IDPKC) protocol; encrypting payment information by using a public key of a payment device being generated according to the IDPKC protocol, and encrypting order information by using a public key of a seller device being generated according to the IDPKC protocol; producing, according to the IDPKC protocol, a dual signature of the encrypted payment information and the encrypted order information by using the private key; transmitting a trans-
(Continued)

action request including the dual-signed payment information and the dual-signed order information to the seller device; and receiving a response to the transaction request from the seller device.

20 Claims, 10 Drawing Sheets

(51) Int. Cl.
*G06Q 20/20* (2012.01)
*G06Q 20/40* (2012.01)
*H04L 9/14* (2006.01)
*H04L 9/32* (2006.01)
*H04L 9/30* (2006.01)
*H04L 9/08* (2006.01)

(52) U.S. Cl.
CPC ........... *G06Q 20/38* (2013.01); *G06Q 20/382* (2013.01); *G06Q 20/38215* (2013.01); *G06Q 20/409* (2013.01); *H04L 9/0866* (2013.01); *H04L 9/0869* (2013.01); *H04L 9/14* (2013.01); *H04L 9/30* (2013.01); *H04L 9/3073* (2013.01); *H04L 9/3247* (2013.01); *G06Q 2220/00* (2013.01); *H04L 2209/56* (2013.01)

(58) Field of Classification Search
CPC .. G06Q 20/102; G06Q 20/385; G06Q 20/382; G06Q 20/38; G06Q 20/38215; G06Q 2220/00; G06Q 20/02; G06Q 20/027; H04L 9/14; H04L 9/3247; H04L 9/3073; H04L 9/0866; H04L 9/0869; H04L 9/30; H04L 2209/56; H04L 9/0847; H04L 9/0861; H04L 98/3263; H04L 9/083
See application file for complete search history.

(56) References Cited

U.S. PATENT DOCUMENTS

| | | | | |
|---|---|---|---|---|
| 6,175,922 B1* | 1/2001 | Wang | ................... | G07F 7/0866 |
| | | | | 713/182 |
| 6,246,771 B1* | 6/2001 | Stanton | ................. | H04L 9/0894 |
| | | | | 380/286 |
| 6,606,744 B1* | 8/2003 | Mikurak | ................. | H04L 29/06 |
| | | | | 717/174 |
| 6,873,977 B1* | 3/2005 | Aggarwal | .............. | G06Q 20/12 |
| | | | | 380/30 |
| 7,069,234 B1* | 6/2006 | Cornelius | .............. | G06Q 20/10 |
| | | | | 705/26.35 |
| 7,096,494 B1 | 8/2006 | Chen | | |
| 7,252,474 B2 | 8/2007 | Belokon et al. | | |
| 7,983,994 B2 | 7/2011 | Hurry | | |
| 8,548,868 B1* | 10/2013 | Lawrence | .......... | G06Q 30/0605 |
| | | | | 705/26.2 |
| 9,445,262 B2 | 9/2016 | Yang et al. | | |
| 2001/0034836 A1* | 10/2001 | Matsumoto | ........... | H04L 9/3231 |
| | | | | 713/176 |
| 2001/0041556 A1* | 11/2001 | Laursen | .................. | H04L 67/26 |
| | | | | 455/406 |
| 2002/0023215 A1* | 2/2002 | Wang | ..................... | G06Q 20/00 |
| | | | | 713/171 |
| 2003/0140235 A1* | 7/2003 | Immega | .................. | H04L 51/30 |
| | | | | 713/186 |
| 2004/0133908 A1* | 7/2004 | Smith | ............. | H04N 21/47211 |
| | | | | 725/31 |
| 2007/0016785 A1* | 1/2007 | Guay | ................... | H04L 9/3236 |
| | | | | 713/176 |
| 2008/0022088 A1* | 1/2008 | Fu | ........................ | H04L 9/0897 |
| | | | | 713/156 |
| 2008/0301057 A1* | 12/2008 | Oren | .................. | H04L 63/0428 |
| | | | | 705/71 |
| 2009/0210701 A1* | 8/2009 | Zhang | .............. | H04N 21/63775 |
| | | | | 713/156 |
| 2009/0228340 A1* | 9/2009 | Bohannon | .......... | G06Q 30/0217 |
| | | | | 705/14.53 |
| 2010/0153273 A1 | 6/2010 | Sellars et al. | | |
| 2010/0169666 A1* | 7/2010 | Dewan | .................... | G06F 21/36 |
| | | | | 713/190 |
| 2011/0072264 A1* | 3/2011 | McNulty | ............. | G06F 21/6245 |
| | | | | 713/168 |
| 2011/0296171 A1* | 12/2011 | Fu | ........................ | H04L 9/0825 |
| | | | | 713/156 |

FOREIGN PATENT DOCUMENTS

| | | | |
|---|---|---|---|
| KR | 10-2006-0118432 A | 11/2006 | |
| KR | 10-0831596 B1 | 5/2008 | |
| KR | 10-2010-0035366 A | 4/2010 | |
| KR | 10-2014-0039400 A | 4/2014 | |
| KR | 10-2014-0074732 A | 6/2014 | |
| WO | WO-2010/141501 2 | * 6/2010 | ............. G06Q 20/00 |
| WO | 2010141501 A2 | 12/2010 | |

OTHER PUBLICATIONS

"SET Secure Electronic Transaction Specification", Book 2: Programmer's Guide, Version 1.0, May 31, 1997 (629 pages total).
Jarupunphol, P., and Buathong, W., "Secure Electronic Transactions-(SET): A Case of Secure System Project Failures", Apr. 2013, International Journal of Engineering and Technology, vol. 5, No. 2, XP055537611, 5 pages total.
Baek, J, et al., A Survey of Identity-Based Cryptography, Aug. 8, 2004, Retrieved from the Internet: URL:https://jan.newmarch.name/publications/auug id survey.pdf, XP055537672, 10 pages total.
Wang, S., and Cao, Z., "Practical Identity-Based Encryption (IBE) in Multiple PKG Environments and its Applications", Nov. 25, 2007, Retrieved from the Internet: URL:https://eprint.iacr.org/2007/100.pdf, XP055537786, 15 pages total.
Communication dated Sep. 16, 2016, from the Intellectual Property Office of Great Britain in counterpart application No. GB1605829.9.
D. Nalla et al. "Signcryption scheme for identity based cryptosystems" Retrieved from the internet on the Sep. 14, 2016 via: https://eprint.iacr.org/2003/066.pdf (10 pages total).
Communication dated Jul. 10, 2019, from the Intellectual Property Office of Great Britain in counterpart application No. GB1605829.9.
"Section 75 for credit card purchases", retrieved on-line Oct. 24, 2018, http://www.theukcardsassociation.org.uk/individual/section-75-for-credit-card-purchaes. (1 page total).
Alison Cooper, "Is it safe to shop online with a debit card?", HowStuffWorks, retrieved on-line Nov. 1, 2018, https://money.howstuffworks.com/personal-finance/online-banking/safe-to-shop-online. (4 pages total).
Mihir Bellare et al., "Design, Implementation, and Deployment of the iKP Secure Electronic Payment System", IEEE Journal on Selected Areas in Communications, vol. 18, No. 4, Apr. 2000, pp. 611-627. (17 pages total).
"SET Secure Electronic Transaction Specification", Book 1: Business Description, Version 1.0, May 31, 1997. (80 pages total).
"XML Specification: 3-D Secure", Secure Trading Limited, Jan. 10, 2018. (36 pages total).
Steven J. Murdoch et al., "Verified by Visa and MasterCard SecureCode: or, How Not to Design Authentication", Financial Cryptography and Data Security '10, Jan. 25, 2010 thru Jan. 28, 2010. (7 pages total).
M. Groves, "Elliptic Curve-Based Certificateless Signatures for Identity-Based Encryption (ECCSI)", Internet Engineering Task Force (IETF), Feb. 2012. (17 pages total).
M. Groves, "Sakai-Kasahara Key Encryption (SAKKE)", Internet Engineering Task Force (IETF), Feb. 2012. (21 pages total).
S. Rajalakshmi et al., "Identity Based Encryption Using mRSA in Electronic Transactions", Information Technology Journal, vol. 6, No. 3, pp. 435-440, 2007. (7 pages total).
Ibrahim Elashry et al., "Identity-based Mediated RSA Revisited", 12th IEEE International Conference on Trust, Security and Privacy in Computing and Communications, 2013, pp. 728-735. (8 pages total).

(56) References Cited

OTHER PUBLICATIONS

Saad M. Darwish et al., "A model to authenticate requests for online banking transactions", Alexandria Engineering Journal, Feb. 28, 2012, vol. 51, pp. 185-191. (7 pages total).
"Digital Signature Standard (DSS)", Federal Information Processing Standards Publication, FIPS PUB 186-4, Jul. 2013. (130 pages total).
Communication dated Jan. 2, 2017 by the International Searching Authority in counterpart International Patent Application No. PCT/KR2016/009224. (PCT/ISA/210).
Communication dated Jan. 2, 2017 by the International Searching Authority in counterpart International Patent Application No. PCT/KR2016/009224. (PCT/ISA/237).
"Identity-based cryptography", Wikipedia, edited on Jul. 7, 2015, 2 pages total, https://en.wikipedia.org/w/index.php?title=Identity-based_cryptography&oldid=670346214.
"IEEE P1363", Wikipedia, last edited Dec. 7, 2020, 4 pages total, https://en.wikipedia.org/wiki/IEEE_P1363#Identitybased_public_key_cryptography_based_on_pairings_(IEEE_Std_1363.3-2013).

* cited by examiner

ELECTRONIC PAYMENT METHOD AND ELECTRONIC DEVICE USING ID-BASED PUBLIC KEY CRYPTOGRAPHY

TECHNICAL FIELD

The present disclosure relates to electronic payment methods, electronic devices, and computer program instructions for use in an electronic payment system. In particular, the present disclosure relates to an electronic payment method and an electronic device that use identity-based public key cryptography (IDPKC).

BACKGROUND ART

Electronic payment systems allow a user to make payments via a payment card, such as a credit or debit card. Transactions using payment cards involve at least the following parties: (1) the individual to whom the payment card is registered, which is referred to as a cardholder; (2) the financial institution that issued the payment card, which is referred to as an issuer; (3) a provider of goods or services, which is referred to as a merchant; (4) a financial institution which accepts payments on behalf of the merchant, which is referred to as the acquirer; and (5) an electronic device which processes merchant's payment messages, which is referred to as a payment gateway.

Various protocols have been developed for card-based electronic payment systems. For example, in a very early payment system utilizing Secure Sockets Layer (SSL) security or Transport Layer Security (TLS), the merchant possesses a certificate and a corresponding public/private-key pair. The cardholder uses the certificate to authenticate the merchant and establishes a confidential channel through which card information can be transmitted, and the card number is only available to the cardholder and the merchant. However, since the merchant has direct access to the payment card details, the cardholder must trust the Merchant not to compromise the card number. In recent years there have been several high-profile cases in which stored credit card details have been stolen from Merchants, the so-called cyber-attacks, leading to concerns over such payment systems.

Under a secure electronic transaction (SET) protocol, a cardholder sends his/her certificates, unencrypted order details, and bank account details encrypted with the payment gateway's public-key to a merchant. In the SET, order details are referred to as order information (OI), and cardholder's bank account details are referred to as payment information (PI). The merchant then requests payment authorization by forwarding cardholder's encrypted PI and encrypted OI to the payment gateway. In the SET protocol, a "dual signature" is used to link two messages that are intended for two different recipients, namely, the OI, which is intended for the merchant, and the PI, which is intended for the Gateway. In a SET system, the merchant cannot access the cardholder's bank account details, and thus, the cardholder's privacy is preserved. However, a major drawback of the SET protocol is the requirement for a public-key infrastructure (PKI) to handle cardholders' certificates. The PKI must be signed by a certificate authority (CA). This results in increases in costs and authentication complexity for Merchants in comparison to the early implementation of payment systems.

DESCRIPTION OF EMBODIMENTS

Solution to Problem

Provides is an electronic payment method including receiving, from a key management service (KMS) server that stores personal information of a user, a private key of the user generated according to an Identity-based public key cryptography (IDPKC) protocol; encrypting payment information by using a public key of a payment device being generated according to the IDPKC protocol, and encrypting order information by using a public key of a seller device being generated according to the IDPKC protocol; producing, according to the IDPKC protocol, a dual signature of the encrypted payment information and the encrypted order information by using the private key; transmitting a transaction request including the dual-signed payment information and the dual-signed order information to the seller device; and receiving a response to the transaction request from the seller device.

BEST MODE

Figure 1:
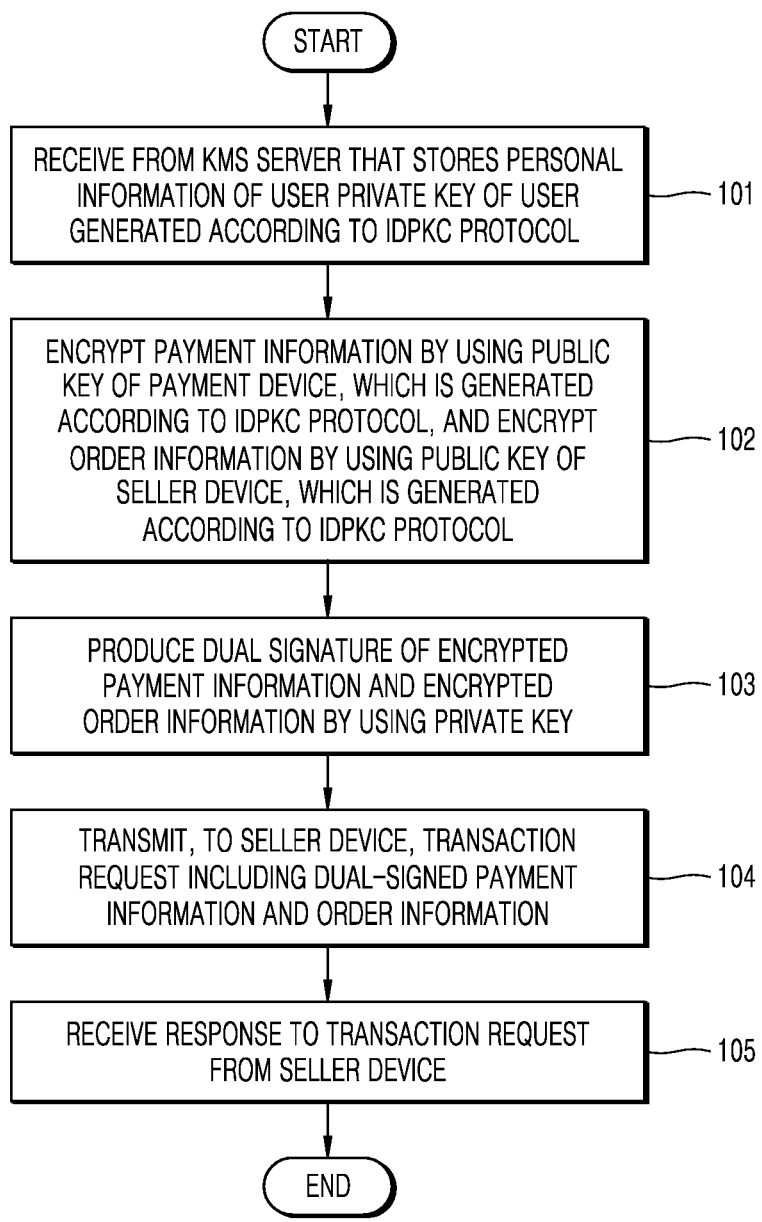
FIG. 1 is a flowchart of an electronic payment system according to an embodiment.

According to an aspect of the present disclosure, an electronic payment method includes receiving, from a key management service (KMS) server that stores personal information of a user, a private key of the user generated according to an Identity-based public key cryptography (IDPKC) protocol; encrypting payment information by using a public key of a payment device being generated according to the IDPKC protocol, and encrypting order information by using a public key of a seller device being generated according to the IDPKC protocol; producing, according to the IDPKC protocol, a dual signature of the encrypted payment information and the encrypted order information by using the private key; transmitting a transaction request including the dual-signed payment information and the dual-signed order information to the seller device; and receiving a response to the transaction request from the seller device.

According to another aspect of the present disclosure, an electronic device includes a memory configured to store at least one program; and a processor configured to perform a secure transaction within an electronic payment system by executing the at least one program stored in the memory, wherein the at least one program includes instructions for executing the operations of: receiving, from a KMS server that stores personal information of a user, a private key of a card holder generated according to an IDPKC protocol; encrypting payment information by using a public key of a payment device being generated according to the IDPKC protocol, and encrypting order information by using a public key of a seller device generated according to the IDPKC protocol; producing, according to the IDPKC protocol, a dual signature of the encrypted payment information and the encrypted order information by using the private key; transmitting a transaction request including the dual-signed payment information and the dual-signed order information to the seller device; and receiving a response to the transaction request from the seller device.

According to another aspect of the present disclosure, a computer-readable recording medium has recorded thereon a program, which, when executed by a computer, performs the above-described electronic payment method.

Mode of Disclosure

Embodiments of the present disclosure are described in detail herein with reference to the accompanying drawings so that this disclosure may be easily performed by one of ordinary skill in the art to which the present disclosure pertains. The disclosure may, however, be embodied in many different forms and should not be construed as being limited to the embodiments set forth herein. In the drawings, parts irrelevant to the description are omitted for simplicity of explanation, and redundant descriptions are omitted by putting like numbers on like elements throughout.

An electronic payment system, which will be described below, may be a card-based electronic payment system or an electronic payment system based on arbitrary suitable payment means.

Transactions via a card-based electronic payment system are typically conducted according to terms set by a Cards Association and usually take place in a two-step process. In the first step, a cardholder provides details of a payment card to a merchant, and the merchant submits an authorization request to a payment gateway. When the payment gateway forwards the request to an issuer, the issuer verifies whether the cardholder's account is valid and whether sufficient funds are available to cover the cost of the transaction. At this point, the funds are "held" and deducted from the cardholder's account, but are not yet transferred to the merchant. In the second step of the process, known as "clearing", the merchant submits batches of authorized transactions to the gateway, typically at the end of the business. When the merchant creates clearing requests and sends the generated clearing requests to the gateway, and the gateway forwards the clearing requests to the Cards Association, the Cards Association debits the issuer for payment and credits the acquirer. The acquirer then pays the merchant after receiving the funds from the issuer.

In the disclosure, a seller device may include a seller server, and a payment device may include a payment server.

FIG. 1 is a flowchart of an electronic payment system according to an embodiment.

In a method of conducting a secure transaction via the electronic payment system, in operation 101, a cardholder device receives a private key of a user, which is generated according to an identity-based public key cryptography (IDPKC) protocol, from a key management service (KMS) server that stores personal information of the user. In operation 102, the cardholder device encrypts payment information (PI) by using a public key of a payment device (hereinafter, referred to a payment gateway), which is generated according to the IDPKC protocol, and encrypts order information (OI) by using a public key of a seller device (hereinafter, referred to a merchant device), which is generated according to the IDPKC protocol. In operation 103, the cardholder device produces a dual signature of the encrypted PI and the encrypted OI by using the private key, according to the IDPKC protocol. In operation 104, the cardholder device transmits, to the seller device, a transaction request including dual-signed PI and OI. In operation 105, the cardholder device receives a response to the transaction request from the seller device.

Figure 2:
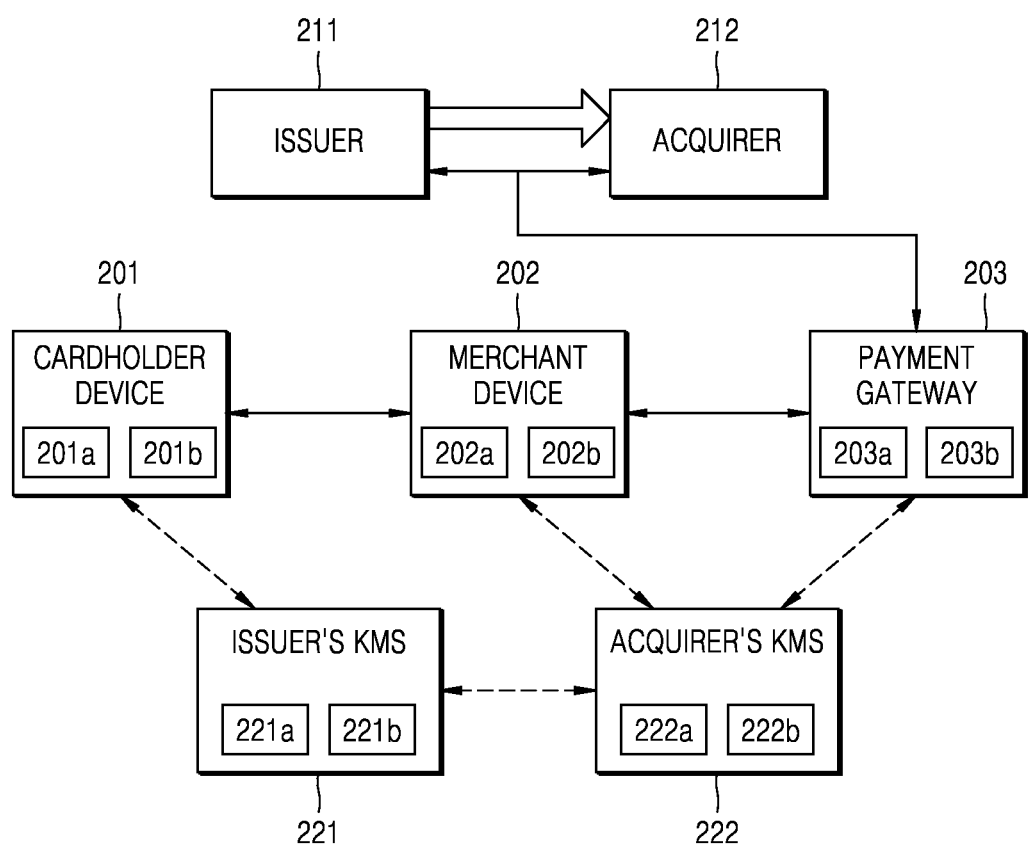
FIG. 2 is a block diagram of an electronic payment system according to an embodiment.

FIG. 2 is a block diagram of an electronic payment system according to an embodiment. The electronic payment system is a card-based payment system in which a cardholder may use a payment card, such as a debit or credit card, to purchase goods or services from a merchant. The electronic payment system of the present embodiment includes a cardholder device 201, a merchant device 202, a payment gateway 203, an issuer 211, and an acquirer 212. The cardholder device 201 may be a suitable electronic device, for example, a smartphone, a tablet, or a laptop or desktop computer.

The electronic payment system may further include one or more key management entities, which can be referred to as key management services (KMSs). The KMSs may be servers. The issuer 211 and the acquirer 212 may use separate KMSs, which are able to communicate securely with one other. According to an embodiment, a single KMS entity may perform functions of both an issuer's KMS 221 and an acquirer's KMS 222. The issuer's KMS 121 and the acquirer's KMS 122 may securely distribute a private-key material to other electronic devices in the electronic payment system.

The cardholder device 201, the merchant device 202, the payment gateway 203, the issuer's KMS 221, and the acquirer's KMS 122 may respectively include memory 201a, 202a, 203a, 221a, and 222a in the form of computer-readable storage media in which computer program instructions may be stored, and may respectively further include suitable processor means 201b, 202b, 203b, 221b, and 222b for executing the stored computer program instructions. Each processor means may include one or more processors. Depending on embodiments, the computer program instructions may be adapted so that an electronic device in which the instructions are executed may perform any of the methods disclosed herein.

The cardholder device 201, the merchant device 202, and the payment gateway 203 may be provided with public information about a KMS in the form of a signed digital document, which may be referred to as a KMS certificate. Examples of information that may be included in a KMS certificate may include a master public key of the KMS, a unique resource identifier (URI) of the KMS, and a validity period of the master public key. The KMS public key may be used to encrypt information during a transaction, according to an IDPKC protocol.

The information in a KMS certificate enables an entity to communicate with the KMS to obtain a private-key material that is subsequently used to conduct a secure transaction. According to an embodiment a certificate of the issuer's KMS 221 is securely provisioned to the cardholder device 201, and a certificate of the acquirer's KMS 222 is also securely provisioned to the merchant device 202 and the payment gateway 203. The KMS certificates may be distributed via any suitable mechanism that sufficiently assures the integrity and authenticity of a KMS certificate. The KMS certificates do not need to be signed by a certificate authority (CA) since they do not need to be shared with third parties after being provisioned to an electronic device.

Examples of methods that may be used to distribute a KMS certificate include, but are not limited to, transmitting the KMS certificate through an online banking application, pre-loading the KMS certificate onto the cardholder device 201, the merchant device 202, and the payment gateway 203, and including the KMS certificate in software that is securely transmitted and installed on the merchant device 202 or the payment gateway 203. When transmitting a KMS certificate through a network, a transport key derived through a bootstrapping process may be used.

In a SET-based system according to the related art, a cardholder sends a copy of his/her certificate to a merchant when placing an order for goods or services. The certificate of the cardholder needs to be signed by the CA in order for a third party, such as the merchant or a payment gateway, to be able to verify that the certificate is authentic. In contrast, according to embodiments of the present disclosure, due to utilization of IDPKC, entities do not share certificates that have been signed by the CA during an electronic transaction, and thus, a public-key infrastructure (PKI) is not used. For example, when the merchant device 202 receives, from the cardholder device 201, a message correctly signed using IDPKC, the merchant device 202 may ascertain that the cardholder device 201 has been provisioned by the issuer's KMS 221. The message may include public parameters of the issuer's KMS 221. When the merchant device 202 and the payment gateway 203 have been provisioned by the acquirer's KMS 222, the cardholder device 201 may use IDPKC to ensure that only the merchant device 202 and the payment gateway 203 are able to decipher and sign their messages.

According to an embodiment, Sakai-Kasahara Key Encryption (SAKKE) and Elliptic Curve-based Certificate-less Signatures for Identity-based encryption (ECCSI) may be used. The SAKKE and the ECCSI are described herein as an example only. According to other embodiments, different IDPKC protocols other than the SAKKE and the ECCSI may be used.

According to an embodiment, the merchant device 202 and the payment gateway 203 are provisioned with a private-key material by establishing a secure communication channel with the acquirer's KMS 222, authenticating themselves, and authenticating the acquirer's KMS 222 using its certificate. The merchant device 202 is also informed of the identifier of the payment gateway 103, as well as being provisioned with the private-key material. Also, according to an embodiment, a predefined format is used for all merchant device identifiers and all payment gateway identifiers, which enables merchants and gateways to be clearly distinguished. For example, all merchants' identifiers may be prefixed with "merchant", and all gateways' identifiers may be prefixed with "gateway". Making the identifiers of merchants and gateways clearly distinct in this way may prevent a cardholder from being tricked into giving his or her account information to a merchant.

According to an embodiment, the cardholder device 201 may be assigned a unique identifier cryptographically linked to the cardholder device 201. For example, the cardholder device 201 may include a smartphone which includes a trusted execution environment (TEE) that contains a public/private-key pair and other security materials provided by a KMS. The cardholder device 201 may include a smart-card with a tamper resistant module which includes a public/private-key pair and a KMS signature that links the unique identifier of the cardholder device 201 to the public key. According to another embodiment, software with a unique identifier and a public/private-key pair may be securely provided to the issuer 211 and installed on the cardholder device 201. The cardholder device 201 may be provisioned with an IDPKC private-key material by establishing a secure communication channel with the issuer's KMS 221. To establish a secure communication channel, the issuer's KMS 221 may use its public/private-key pair to authenticate itself, may authenticate a cardholder by using a suitable method, for example a static password or a One-Time-Password (OTP), and may further authenticate the issuer's KMS 221 using its certificate.

According to an embodiment, by provisioning the IDPKC private-key material using a public/private-key pair integrated into a cardholder device, embodiments of the present disclosure may be compatible with electronic devices including public/private-key pairs based on different cryptographic systems. According to another embodiment, an alternative method may be used. For example, the IDPKC private-key material may be directly integrated into the cardholder device 201.

Figure 3:
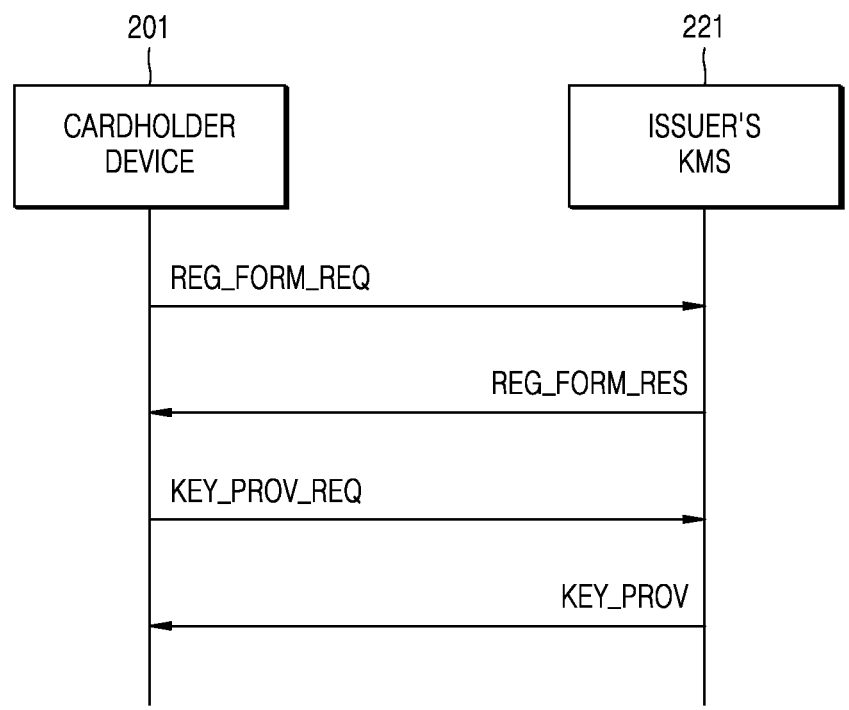
FIG. 3 is a flowchart of transmission of a series of messages during a key provisioning process, according to an embodiment.
Figure 4:
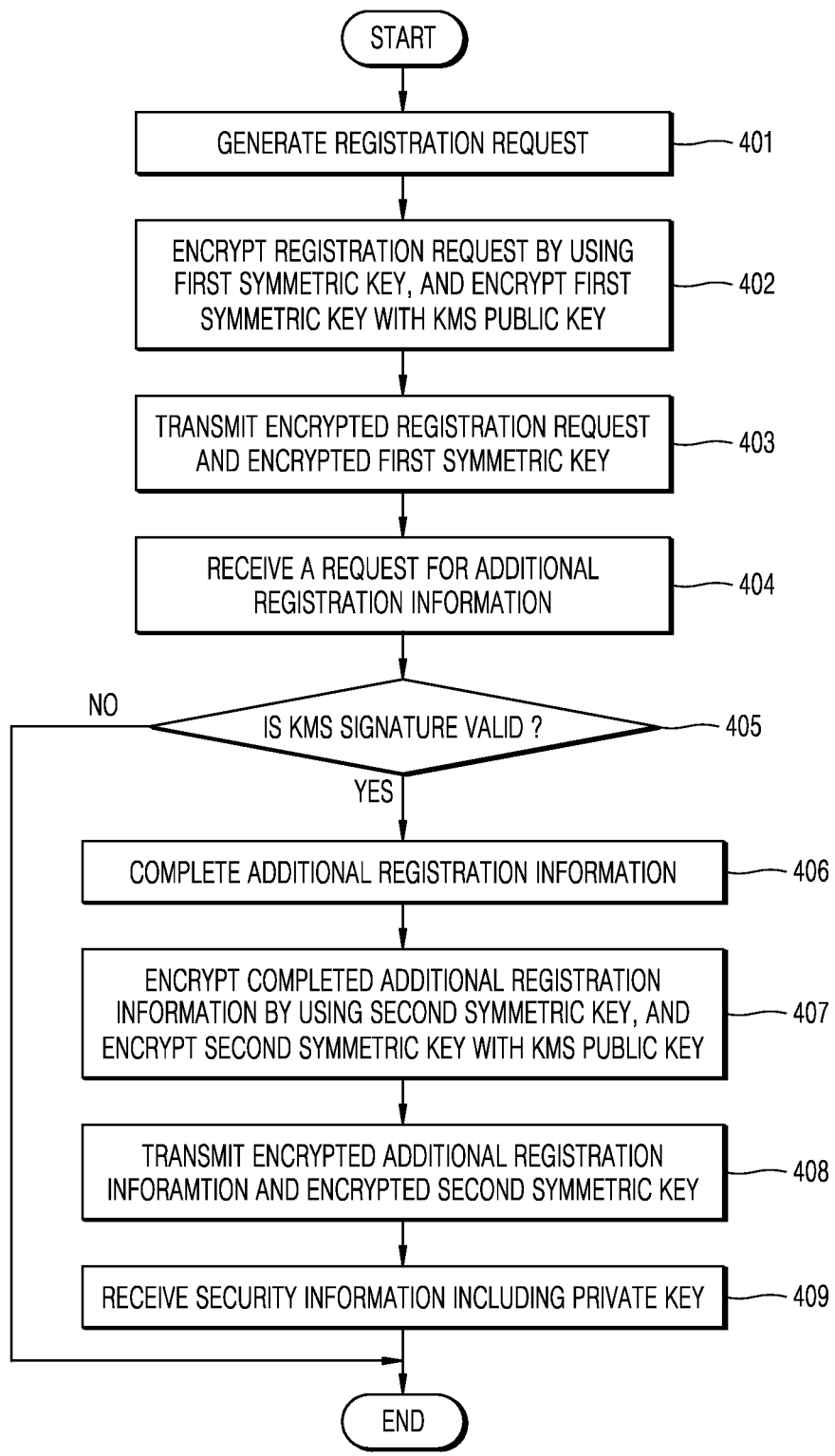
FIG. 4 is a flowchart of a method performed by a cardholder device during the key provisioning process of FIG. 3, according to an embodiment.
Figure 5:
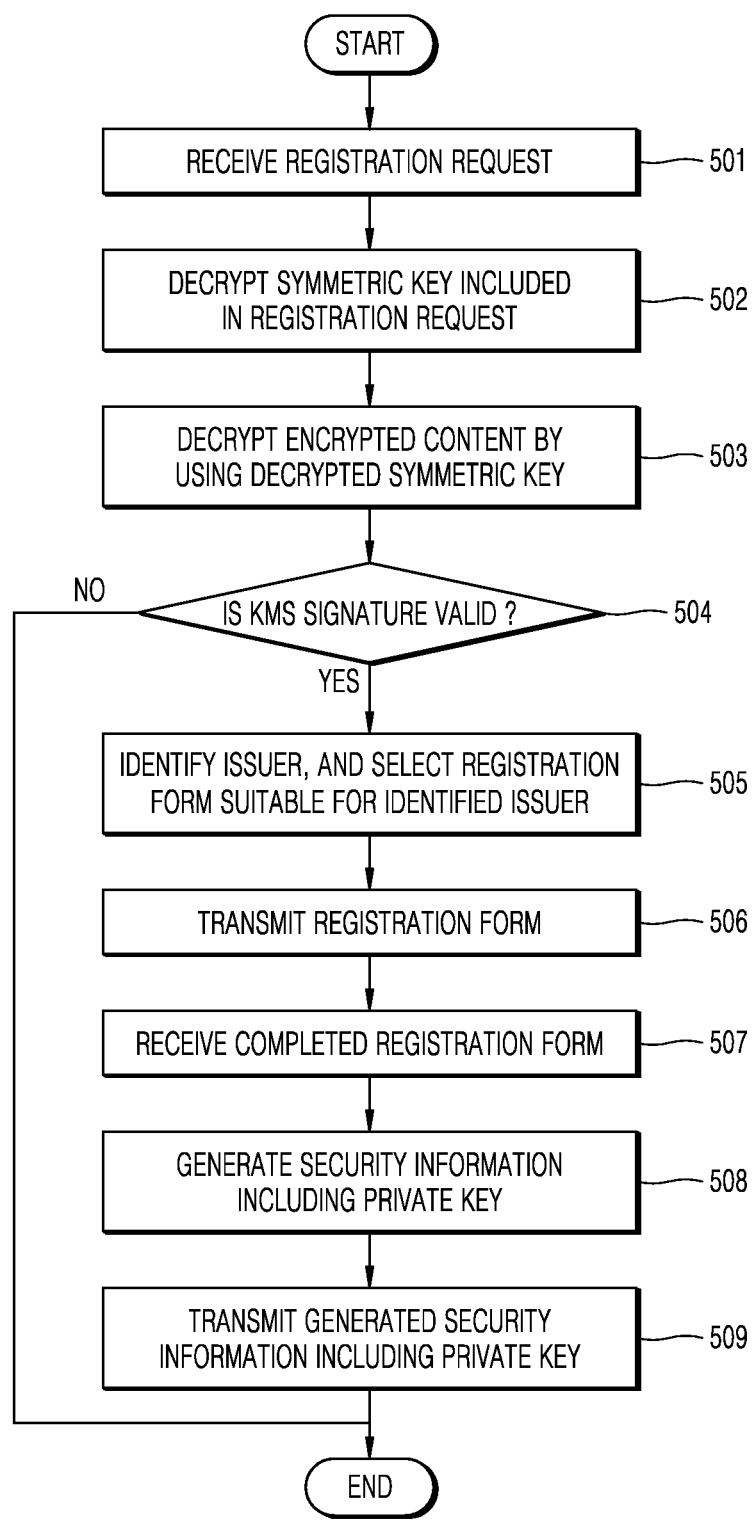
FIG. 5 is a flowchart of a method performed by a key management service (KMS) during the key provisioning process of FIG. 3, according to an embodiment.

FIGS. 3, 4, and 5 illustrate a key provisioning process for use in the electronic payment system of FIG. 2 according to an embodiment. FIG. 3 is a flowchart of transmission of a series of messages during a key provisioning process. FIG. 4 is a flowchart of a method performed by a cardholder device during the key provisioning process. FIG. 5 is a flowchart of a method performed by an issuer's KMS during the key provisioning process. The methods shown in FIGS. 3, 4, and 5 enable the cardholder device 201 to be securely provisioned with a necessary security material to participate in the electronic payment system, such as a private-key material and KMS certificates. In operation 401, the key provisioning process begins with the cardholder device 201 generating a registration request REG_FORM_REQ for registering a payment card with the issuer's KMS 221. According to an embodiment, the registration request may include a time stamp and a card identifier for uniquely identifying the payment card to be registered. According to an embodiment, the card identifier may be a 16-digit payment card number for a credit or debit card. The card identifier may be an identifier different from the identifier of a cardholder. The payment card may be used by the issuer's KMS 221 to verify whether the registration request is valid, and the time stamp may be used to avoid replay attacks. The registration request generated in operation 401 is also signed using the public/private-key pair held by the cardholder device 201. According to an embodiment, the public/private-key pair may be stored in a TEE.

In operation 402, the signed registration request is encrypted using a first symmetric key, and the first symmetric key is encrypted using the public key of the issuer's KMS 221. For example, the first symmetric key may be enveloped using ElGamal encryption. According to an embodiment, the first symmetric key may be randomly generated. According to another embodiment, the first symmetric key may be selected from a predefined list of symmetric keys. According to an embodiment, in encryption of the first symmetric key using the public key of a KMS, one or more KMS public keys corresponding to one or more KMSs may be received and stored in a memory according to the IDPKC protocol, and an identifier of the KMS that is used by a merchant may be received to search for a KMS public key corresponding to a KMS identifier from the memory. The first symmetric key may be encrypted using a found KMS public key.

In operation 403, an encrypted REG_FORM_REQ message and the encrypted first symmetric key are then transmitted to the issuer's KMS 221.

According to an embodiment, data to be shared, such as the REG_FORM_REQ message, is encrypted using symmetric key encryption instead of using asymmetric key encryption (public key encryption), the asymmetric key encryption being computationally expensive. Hence, it is more efficient to encrypt data via symmetric encryption and then asymmetrically encrypt a symmetric key by using a public key encryption key (KEK). According to another embodiment, the REG_FORM_REQ message may be directly encrypted via asymmetric encryption. In this case, operation 402 of FIG. 4 is omitted.

In operation 404, the cardholder device 201 receives a request for additional registration information REG_FORM_RES. According to an embodiment, the REG_FORM_RES message is signed by the issuer's KMS 221, and in operation 405, the cardholder device 201 verifies the KMS' signature to determine whether the signed message is authentic. When verification fails, the process terminates. On the other hand, when the signature is determined to be valid in operation 405, the process continues to operation 406 and the cardholder device 201 completes the registration form.

In operation 406, the cardholder device 201 fills out the registration form with the requested information. According to an embodiment, the requested information may include a name of a cardholder of a payment card, an expiration date of the payment card, a billing address to which the payment card is registered, and/or any additional information that may be deemed necessary to identify a requester, such as a password or an OTP, as a valid cardholder. According to an embodiment, the cardholder device 201 may generate a random number that will be used by the issuer's KMS 221 to link the cardholder's identifier to the account in which funds accessible via the payment card are stored.

In operation 407, the completed registration form and the generated random number are encrypted using a second symmetric key, and the second symmetric key is encrypted using the public key of the issuer's KMS 221 according to a suitable IDPKC protocol. According to an embodiment, the IDPKC protocol may be SAKKE. According to an embodiment, the registration form, the random number, and the second symmetric key may be signed using the private key of the cardholder device 201.

Using a second symmetric key to encrypt the KEY_PROV_REQ message provides additional security, by ensuring that sensitive account information remains confidential even if the first symmetric key has been compromised. According to another embodiment, the KEY_PROV_REQ message may be encrypted using the first symmetric key, which is the same key used to encrypt the REG_FORM_REQ message.

In operation 408, the cardholder device 201 transmits, to the issuer's KMS 221, the KEY_PROV_REQ message including the second symmetric key and the encrypted additional registration information. After the request has been processed by the issuer's KMS 221, the cardholder device 201 receives a KEY_PROV (key provisioning) message including necessary security information, in operation 409.

According to an embodiment, the issuer's KMS 221 encrypts the KEY_PROV message by using a public key of the public/private-key pair held by the cardholder device 201. According to an embodiment, the public/private-key pair may be stored in a TEE and may be signed by the issuer's KMS 221. When verification of the KMS' signature is completed, the cardholder device 201 decrypts the KEY_PROV message and stores security information, and thus the card registration process is completed. According to an embodiment, the security information is stored securely in the cardholder device 201. For example, the security information may be stored in a TEE or in a tamper-proof module.

The KEY_PROV message may include any security information necessary for the cardholder device 201 to participate in transactions in the electronic payment system. The KEY_PROV message includes an IDPKC private key of the cardholder device 201. According to an embodiment, the security information may further include a signature of an account security material that links a cardholder's identifier to an account associated with the payment card, and may further include a series of payment card numbers, the random number generated by the cardholder device 201 in operation 406, and a random number generated by the issuer's KMS 221. The cardholder's identifier may be any suitable public identifier, for example, an email address or telephone number belonging to the cardholder.

In some embodiments, the received security information may further include one or more KMS certificates. Each KMS certificate may include a master public key of the KMS together with any other information that is required to enable communication with that a particular KMS, such as a URI of the KMS and/or a validity period of the master public key. The received KMS certificates may be stored in a KMS certificate cache within the cardholder device 201.

The method by which the issuer's KMS 221 processes the received registration request will now be described with reference to FIG. 5.

In operation 501, the issuer's KMS 221 receives the REG_FORM_REQ message from the cardholder device 201. According to an embodiment, the REG_FORM_REQ message is signed by the cardholder device 201 and encrypted using symmetric key encryption, and a symmetric key is encrypted using the ElGamal public key of the issuer's KMS 221. In operation 502, the issuer's KMS 221 decrypts the enveloped symmetric key. In operation 403, the issuer's KMS 221 uses the decrypted symmetric key to decrypt the remaining encrypted content in the REG_FORM_REQ message. In operation 504, the issuer's KMS 221 checks whether the signature and identifier of the cardholder device 201 are valid. When the signature and identifier of the cardholder device 201 are not valid, the process terminates. When the signature and identifier of the cardholder device 201 are valid, the process proceeds to operation 505. Operations 502 through 504 may be omitted or modified according to the encryption method used by the cardholder device 201, and whether or not the REG_FORM_REQ message has been digitally signed.

In operation 505, the issuer's KMS 221 may identify an issuer from information contained in the REG_FORM_REQ message. For example, in the case of a debit or credit card, the issuer may be identified using first six to eleven digits of the card number. Once the issuer has been identified, the issuer's KMS 221 selects an appropriate registration form for the issuer. In operation 506, the issuer's KMS 221 digitally signs the form and returns a REG_FORM_RES message including the signed form to the cardholder device 201. For example, the issuer's KMS 221 may sign the form by using an elliptic curve digital signature algorithm (ECDSA) or another suitable digital signature method.

In operation 507, the issuer's KMS 221 receives a KEY_PROV_REQ message including the completed registration form. According to an embodiment, the issuer's KMS 221 decrypts a digital envelope to obtain the second symmetric key, and verifies the signature of the message. The decrypted second symmetric key is used to decrypt a remainder of the message. The issuer's KMS 221 may communicate with the issuer to verify information included in the registration request. When the signature is valid and the information is verified by the issuer, the issuer's KMS 221 proceeds to operation 508. In operation 508, the issuer's KMS 221 generates necessary security information including a private key corresponding to a cardholder's identifier.

In operation 508, the issuer's KMS 221 generates a new random number that is concatenated with a random number provided by the cardholder device 121 in the completed registration form, an identifier of the cardholder, and a card identifier. For example, the card identifier may be a 16-digit card number. The issuer's KMS 221 produces a signature of a result. According to an embodiment, the security information includes a private key, the new random number, the signature, and a cache of certificates of trusted KMSs. According to an embodiment, the security information is signed and encrypted using the second symmetric key. In operation 509, a resulting message, KEY_PROV, namely, the security information including a private key, is transmitted to the cardholder device 201.

A key provisioning process that is usable to provide the cardholder device 201 with a private key that is cryptographically linked to the identifier of a payment card is illustrated in FIGS. 3, 4, and 5. According to an embodiment, the REG_FORM_REQ, REG_FORM_RES, KEY_PROV_REQ, and KEY_PROV messages are transmitted through an online banking application. According to another embodiment, other secure communication methods may be used during the key provisioning process.

According to an embodiment, the issuer's KMS 221 returns the REG_FORM_RES message to inform the cardholder device 201 of a correct format for sending necessary information for a payment card to be registered. According to another embodiment, the suitable format may have been agreed in advance, for example, the suitable format may be defined by an industry standard. In this case, the REG_FORM_REQ and REG_FORM_RES messages in FIG. 2 may be omitted, and the cardholder device 201 may generate the KEY_PROV_REQ message as an initial registration request.

A method similar to that shown in FIGS. 3 through 5 may be used to provision the merchant device 202 with a private-key material. For example, the merchant device 202 may have an initial private/public-key pair embedded in software provided by the acquirer 212. The embedded initial private/public-key pair may be used to encrypt and sign messages during the key provisioning process. In the case of the merchant device 202, the acquirer's KMS 222 may verify information included in the KEY_PROV_REQ message provided by the acquirer 212 instead of the issuer 211. In contrast to the cardholder device 201 which only requires a private signing key, the merchant device 202 may also be provisioned with a private decryption key as well as a private signing key. According to an embodiment, when the acquirer 212 may use any suitable method to provision a payment gateway with a necessary private key material, a method such as that shown in FIGS. 3 through 5 may be used, and embodiments are not limited thereto.

Figure 7:
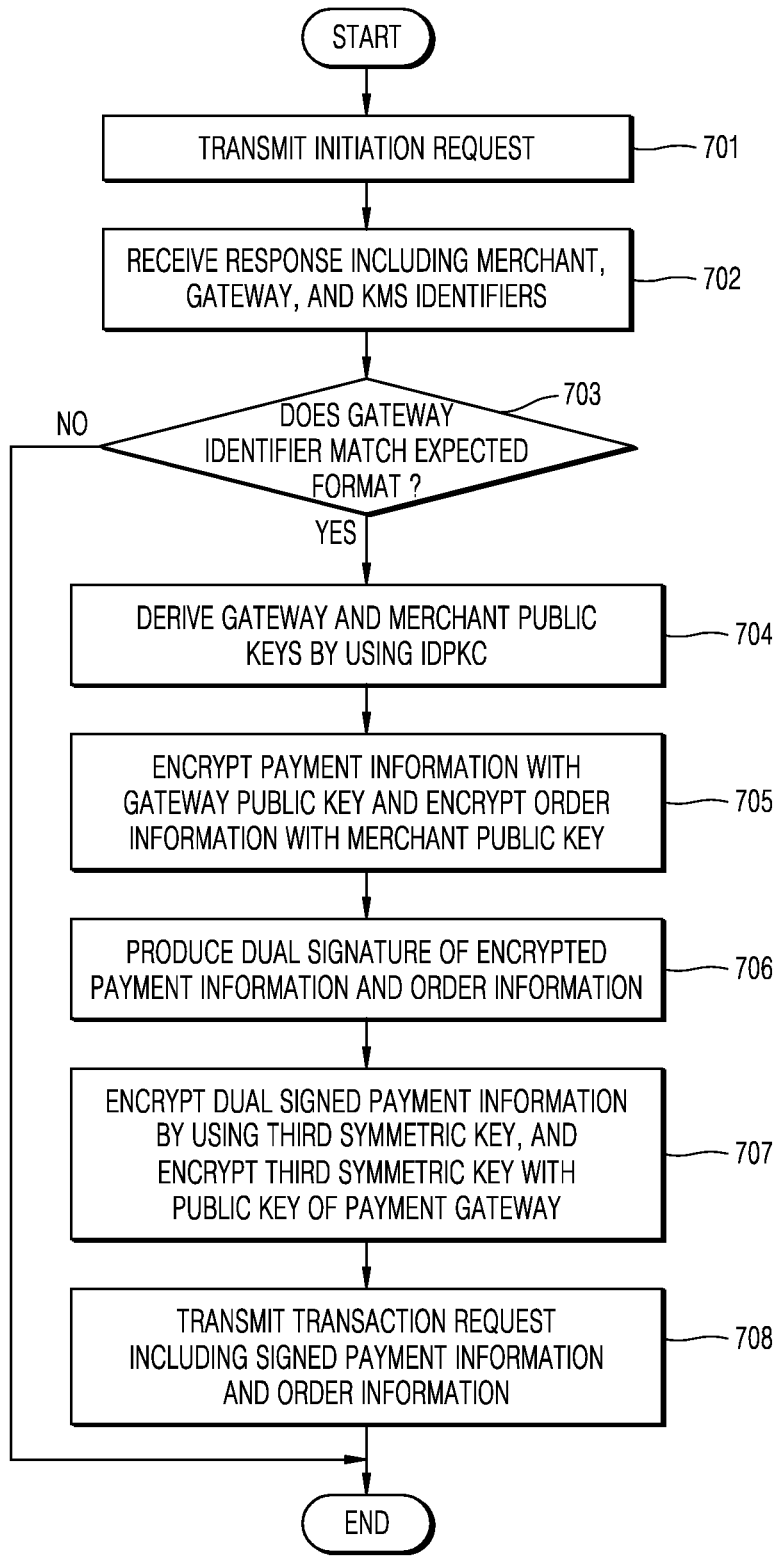
FIG. 7 is a flowchart of a method performed by a cardholder during the transaction of FIG. 6, according to an embodiment.
Figure 8:
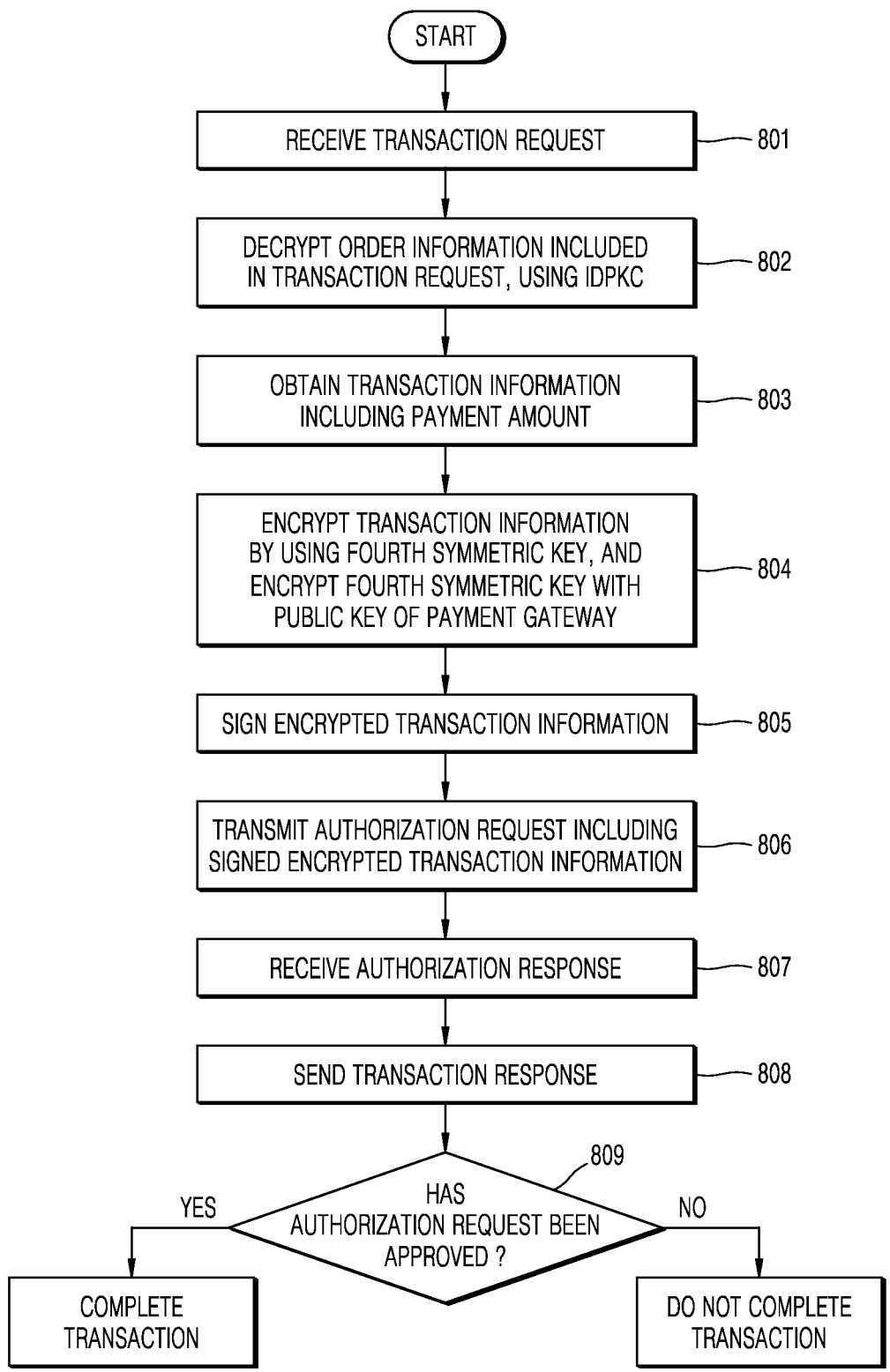
FIG. 8 is a flowchart of a method performed by a merchant during the transaction of FIG. 6, according to an embodiment.
Figure 9:
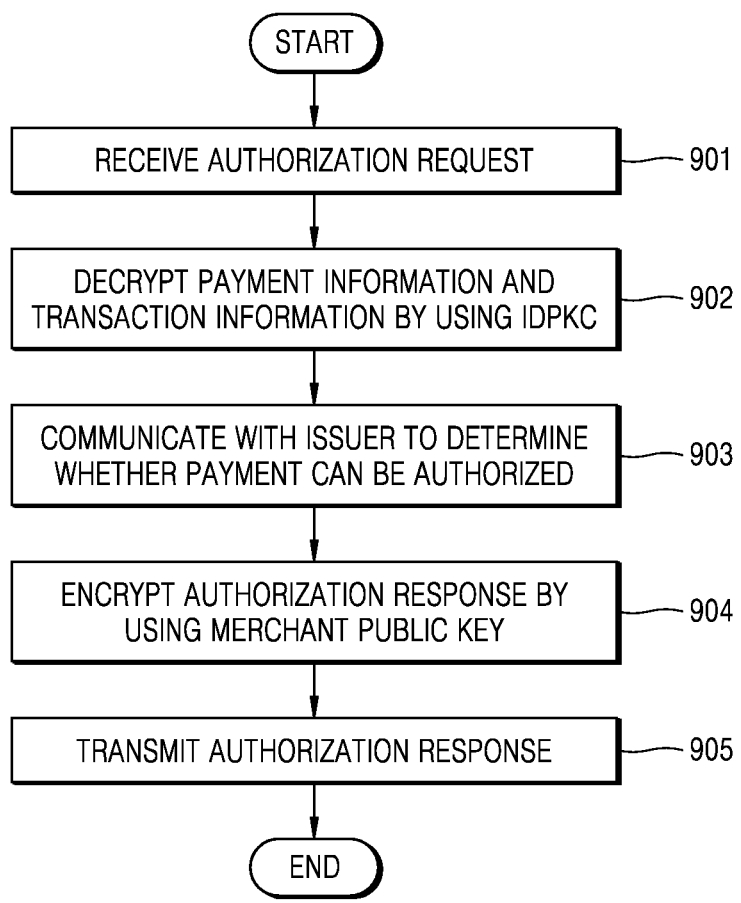
FIG. 9 is a flowchart of a method performed by a payment gateway during authorization of FIG. 6, according to an embodiment.

The private keys provided to the cardholder device 201, the merchant device 202, and the payment gateway 203 may subsequently be used during secure transactions involving the payment card. FIGS. 6 through 9 illustrate an IDPKC-based secure transaction process according to an embodiment. As shown in FIG. 5, during the secure transaction, the cardholder device 201, the merchant device 202, and the payment gateway 203 exchange a series of messages with each other. Method operations performed by the cardholder device 201, the merchant device 202, and the payment gateway 203 are shown in the flowcharts of FIGS. 7, 8, and 9, respectively. According to an embodiment, a two-step transaction process involving authorization and clearing is used, similar to an SET system. According to other embodiments, clearing may be omitted, and funds may be automatically transferred during the authorization operation.

A transaction is initiated when a cardholder has selected goods or services to be purchased at an agreed price. In operation 701, a new transaction begins when the cardholder device 201 generates an initiation request INIT_REQ to initiate a secure transaction. The INIT_REQ message is sent to the merchant device 202 to request the IDPKC identifiers of the merchant device 202 and the payment gateway 203 and KMS identifiers thereof. According to an embodiment, the merchant device 202 and the payment gateway 203 both use the same issuer's KMS 222. According to another embodiment, the merchant device 202 and the payment gateway 203 may use different issuer's KMSs.

In operation 702, the cardholder device 201 receives a response INIT_RES from the merchant device 202. According to an embodiment, the INIT_RES message may include a unique transaction identifier provided by the merchant device 202, in addition to the identifiers for the merchant device 202, the payment gateway 203, and the acquirer's KMS 222.

According to an embodiment, a merchant identifier and a gateway identifier are formatted differently. For example, the merchant identifier may be prefixed with "merchant", and the gateway identifier may be prefixed with "gateway". In operation 703, the cardholder device 201 checks whether the received public identifier for the payment gateway 203 matches an expected format for a payment gateway. In operation 703, the cardholder device 201 may also verify the format of the received merchant identifier. However, it may be less important to verify the format of the merchant identifier than the payment gateway identifier, since the information encrypted by the merchant identifier is generally less sensitive than the information encrypted by the gateway identifier. When the INIT_RES message is signed by the merchant device 202, then the signature may also be verified, in operation 703.

According to an embodiment, a transaction process begins with exchange of the initialization request and response messages, INIT_REQ and INIT_RES. According to other embodiments, the initialization messages may be omitted. For example, when a cardholder has previously purchased goods or services from a merchant, the cardholder may already have public identifiers of a merchant and a gateway. In this case, the cardholder may skip the initialization operation and proceed directly to operation 705 of generating and encrypting payment information (PI) and order information (OI).

When verification of the payment gateway identifier and/or the signature is unsuccessful in operation 703, then the process terminates. On the other hand, when verification is successful, then the process continues to operation 704, and the cardholder device 201 derives the IDPKC public keys of the payment gateway 203 and the merchant device 202.

In operation 705, the cardholder device 201 encrypts PI by using the public key of the payment gateway 203 and encrypts OI by using the public key of the merchant device 202, according to the IDPKC protocol. Accordingly, the PI may only be read by the payment gateway 203, and the OI may only be read by the merchant device 202. According to an embodiment, a unique transaction identifier provided by the merchant device 202 may be included in both the PI and the OI in order to enable the payment gateway 203 to link the PI and the OI during the authorization operation.

The OI may include information which links a transaction request to previous communication between the cardholder device 201 and the merchant device 202 earlier in a shopping and ordering process. According to an embodiment, the OI does not contain purchase information, such as a description of the purchased goods or services or purchase terms. Instead, the purchase information is exchanged between the cardholder device 201 and the merchant device 202 during a shopping stage before the transaction initiation message INIT_REQ is sent. PIs provide financial information that is important for a financial network or the issuer 211 to process an authorization, from the cardholder device 201 to the payment gateway 203. According to an embodiment, a secret random number is derived during the key provisioning process.

In operation 706, the cardholder device 201 produces a dual signature of encrypted PI and encrypted OI according to the IDPKC protocol, by using a private key that is cryptographically linked to the cardholder's public identifier. The IDPKC protocol allows the merchant device 202 and the payment gateway 203 to verify the signature by using the cardholder's public identifier. According to an embodiment, a dual signature is produced by computing message digests of both the OI and the PI and signing a series of digests by using ECCSI. Thereafter, the message digests of the OI and the PI are sent along with the dual signature in a subsequent transaction request message PURCH_REQ.

In operation 707, before transmitting the PURCH_REQ message, the cardholder device 201 performs an additional encryption operation. The cardholder device 201 generates a random symmetric encryption key (hereinafter, referred to as a third symmetric key). The third symmetric key is used to encrypt the dual signed PIs and an account number, and is then enveloped using the public key of the payment gateway 203, in a similar method to that described above with reference to operations 402 and 407 of FIG. 4.

In operation 708, the cardholder device 201 transmits a PURCH_REQ message to the merchant device 202. According to an embodiment, the PURCH_REQ message may include a dual signed OI, an encrypted cipher-text of the dual signed PI, the account number, and the encrypted third symmetric key. According to an embodiment, the PURCH_REQ message may include a KMS signature that links a cardholder identifier to the account number according to the method described above with reference to operation 508 of FIG. 5.

Figure 6:
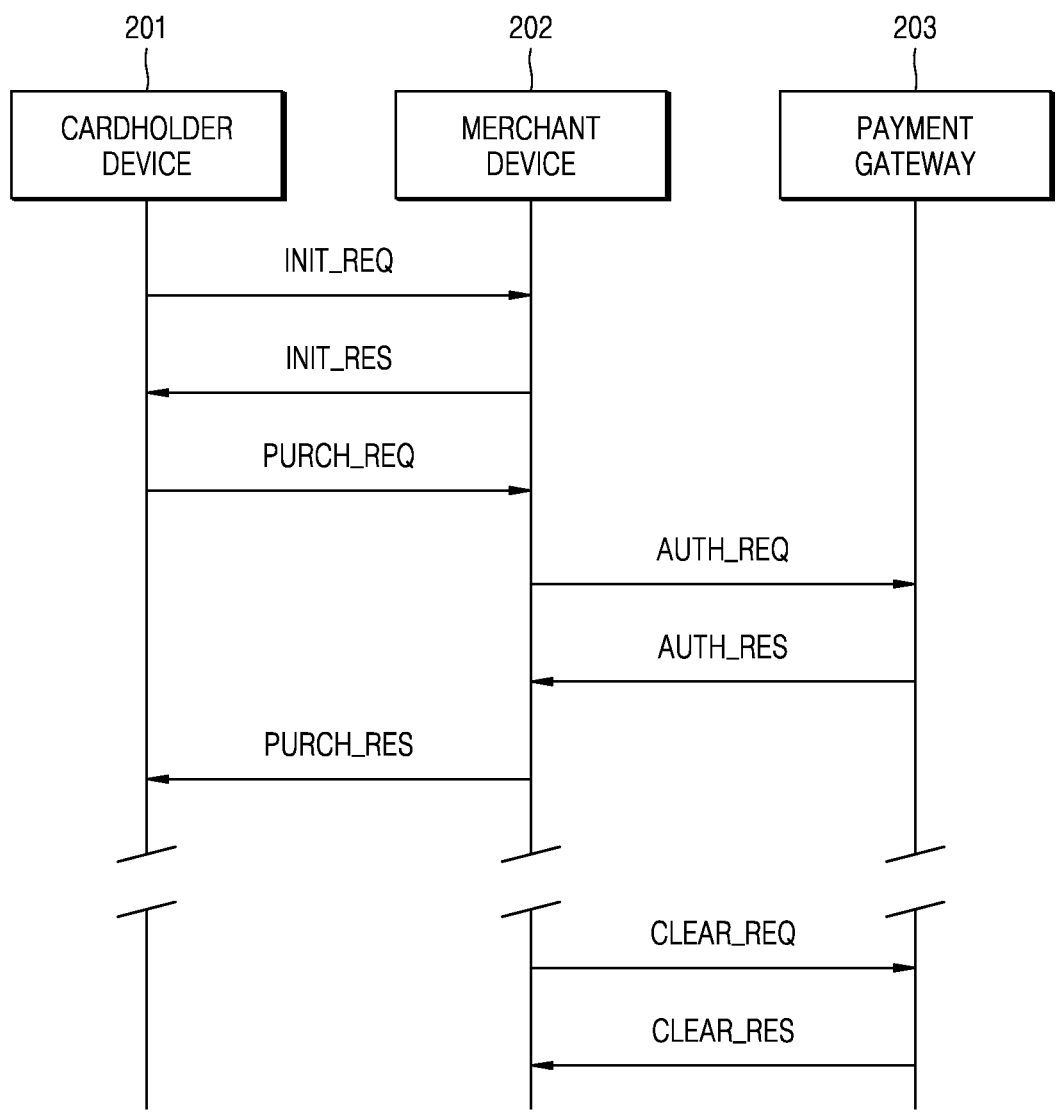
FIG. 6 is a flowchart of a method used by the electronic payment system of FIG. 2 to transmit a series of messages during a transaction, according to an embodiment.

As shown in FIG. 6, the cardholder device 201 subsequently receives, in the form of a signed PURCH_RES message, confirmation that authorization has been successful. The cardholder device 201 may verify the Merchant's signature and may take some action, for example, displaying a message to the cardholder, based on the contents of the PURCH_RES message. The merchant may separately complete the cardholder's order by shipping agreed goods or performing agreed services.

FIG. 8 is a flowchart of a method performed by the merchant device 202 during authorization, according to an embodiment. In operation 801, the merchant device 202 receives the PURCH_REQ message. In operation 802, the merchant device 202 decrypts the PURCH_REQ message by using its own IDPKC private key. Since PI in the PURCH_REQ message is encrypted using a public key of the payment gateway 203, the merchant device 202 is unable to read the contents of the PI.

In operation 803, the merchant device 202 uses received OI to determine a payment amount to be authorized. According to an embodiment, the OI may specify the amount to be authorized, or the merchant device 202 may use information contained in the OI to identify an amount previously agreed with the cardholder earlier in the shopping process. The merchant device 202 may obtain a unique transaction identifier from the OI.

In operation 804, the merchant device 202 may encrypt transaction information by using a public key of the payment gateway 203, according to the IDPKC protocol. The transaction information may include the payment amount to be authorized and the transaction identifier. According to an embodiment, a computationally efficient two-layer encryption scheme is used, as described above with reference to operations 402, 407, and 707. In particular, the transaction information is encrypted using a fourth symmetric key, and the fourth symmetric key is encrypted using the public key of the payment gateway 203 according to the IDPKC protocol. According to an embodiment, SAKKE encryption may be used. According to another embodiment, a different IDPKC protocol may be selected.

In operation 805, the merchant device 202 signs the encrypted transaction information by using IDPKC. According to an embodiment, an ECCSI signature may be used. According to another embodiment, a different signature method may be selected. In operation 806, an authorization request AUTH_REQ including signed encrypted transaction information and received encrypted payment information is transmitted to the payment gateway 203. The authorization request AUTH_REQ may include received encrypted PI and encrypted transaction information and further include a KMS signature that links the cardholder's identifier to the account. In embodiments where two-layer encryption is used, the encrypted fourth symmetric key may be included in the authorization request AUTH_REQ.

After transmitting the authorization request, an authorization response AUTH_RES is received, in operation 807. The authorization response AUTH_RES indicates whether or not payment has been authorized by the issuer 211. According to an embodiment, the AUTH_RES message may include a symmetric key that has been encrypted using the public key of the merchant device 202. The merchant device 202 may decrypt the symmetric key, and use the decrypted symmetric key to decrypt other encrypted content in the AUTH_RES message. The AUTH_RES message may be signed by the payment gateway 203. When the signature is valid, authorization is successful, and the merchant device 202 stores the authorization response. According to an embodiment, the AUTH_RES message may further include a clearing token to be used when performing payment through a clearing request, and the clearing token is may be stored in the merchant device 202.

After receiving the AUTH_RES message, in operation 808, the merchant device 202 creates a transaction response message PURCH_RES. The transaction response message PURCH_RES is digitally signed using ECCSI and sent to the cardholder device 201. In operation 809, the merchant device 202 determines whether or not to complete the transaction according to whether or not authorization was successful.

According to another embodiment, the merchant device 202 may send the PURCH_RES message before performing authorization. In this case, the cardholder device 201 may later send a query message to the merchant device 202 in order to determine whether authorization has been performed.

FIG. 9 is a flowchart of a method performed by the payment gateway 203 during authorization, according to an embodiment. In operation 901, the payment gateway 103 receives the AUTH_REQ message. In operation 902, the payment gateway 203 decrypts the PI and the transaction information by using IDPKC. According to an embodiment, the payment gateway 203 uses its private key to decrypt the fourth symmetric key included in the received AUTH_REQ message. The payment gateway 203 uses the obtained fourth symmetric key to decrypt the transaction information, and verifies the signature of the merchant device 202. To decrypt the PI, the payment gateway 203 decrypts the cardholder's envelope to obtain another symmetric key, and uses the obtained symmetric key to decrypt the PI. The payment gateway 203 may verify the dual signature to ensure that the PI was signed using the cardholder's private key and that the PI has not been tampered with. The payment gateway 203 may verify a KMS' signature to confirm that the identifier is representative of the cardholder's account. The payment gateway 203 may check whether the transaction identifier and an amount indicated by the merchant device 202 match values in the PI.

In operation 903, the payment gateway 203 communicates with the issuer 211 identified by the payment information, in order to determine whether a payment amount indicated by the transaction information can be authorized. The payment gateway 203 may use any suitable method to communicate with the issuer 211. For example, the payment gateway 203 may use IDPKC encryption and signatures or other types of cryptographic protocols, when communicating with the issuer 211.

After receiving an authorization response from the issuer 211, the payment gateway 203 generates and digitally signs an authorization response message AUTH_RES by using its identifier and ECCSI, in operation 904. The AUTH_RES indicates to the merchant device 202 whether or not the issuer 211 has authorized payment of the requested amount. In embodiments in which clearing is performed separately from authorization, the AUTH_RES message may further include a clearing token. According to an embodiment, the AUTH_RES message may be encrypted with a symmetric key enveloped with the identifier of the merchant device 202, by using SAKKE encryption. In operation 905, the encrypted AUTH_RES message including the enveloped symmetric key is transmitted to the merchant device 202.

Figure 10:
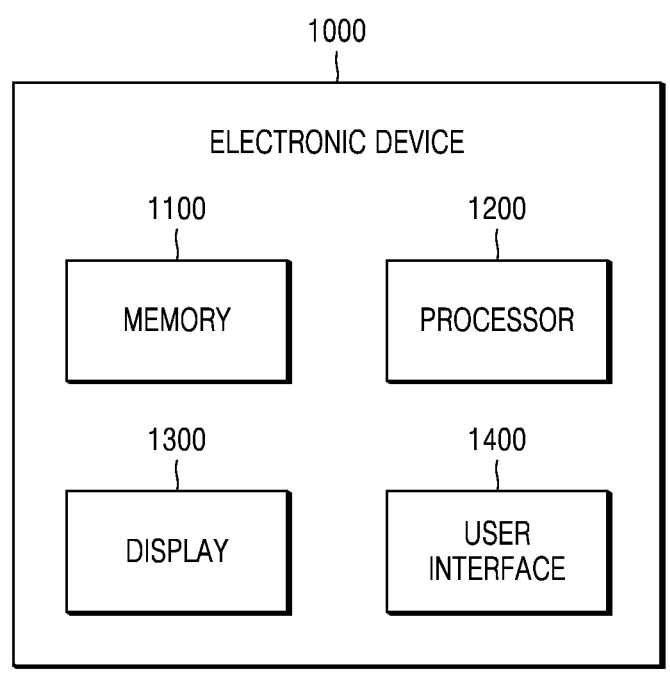
FIG. 10 is a block diagram of a structure of a cardholder device according to an embodiment.

FIG. 10 is a block diagram of an electronic device 1000 according to an embodiment. The electronic device 1000 may be the cardholder device 201 and the merchant device 202. The electronic device 1000 may include a memory 1100, a processor 1200, and a display 1300 that displays a receive response. The electronic device 1000 may further include a user interface 1400, and may perform the above-described processes, based on a user input made via the user interface 1400. However, a structure of the electronic device 1000 is not limited thereto.

According to some embodiments, a two-stage process is used in which authorization and clearing are performed separately. According to an embodiment, the clearing is conducted as follows. After a certain period of time after an order has been processed (for example, at the end of the business day), the merchant device 202 requests payment by generating and digitally signing a clearing request by using an IDPKC signature. According to an embodiment, the IDPKC signature method may be ECCSI. The clearing request may include a final amount of the transaction and the transaction identifier, and may further include other information about the transaction. According to an embodiment, the clearing request may be enveloped using a randomly generated symmetric key, and the randomly generated symmetric key is enveloped by the payment gateway's identifier using IDPKC encryption. According to an embodiment, the IDPKC encryption may be SAKKE. The merchant device 202 transmits a clearing request message CLEAR_REQ including an encrypted clearing request and an encrypted token to the payment gateway 203.

In response to the CLEAR_REQ message, the payment gateway 203 decrypts the enveloped symmetric key and uses the decrypted symmetric key to decrypt the clearing request. According to an embodiment, the payment gateway 203 may verify the signature applied by the merchant device 202 to check whether the request was signed by using the merchant's private key. The payment gateway 203 may use information from the clearing request and the clearing token in order to generate a request to be sent through the financial network to the issuer 211. In response to the request from the payment gateway 203, the issuer 211 transfers the funds to the acquirer 212.

The payment gateway 203 generates and digitally signs a clearing response message CLEAR_RES by using an IDPKC signature, for example, ECCSI. According to an embodiment, the IDPKC signature method may be ECCSI. The clearing response message CLEAR_RES may be encrypted with a randomly generated symmetric key which in turn is enveloped by the identifier of the merchant device 202 using IDPKC encryption. According to an embodiment, the IDPKC encryption may be SAKKE. The signed encrypted CLEAR_RES message may be sent to the merchant device 202, and the merchant device 202 may decrypt a symmetric key from a SAKKE envelope and decrypt the remainder of the CLEAR_RES message. After verifying the signature, the merchant device 202 may store the CLEAR_RES message, which is to be used for reconciliation with payment received from the acquirer 212.

Although the embodiment described here relates to a single clearing request, a plurality of transactions may be included in a single clearing request message. According to other embodiments, a separate clearing process may be omitted, when the system is configured to transfer funds during the authorization operation. For example, in other embodiments, the amount specified in an authorization request may be immediately transferred from the issuer 211 to the acquirer 212 after the issuer 111 receives the authorization request.

Embodiments have been described above in which IDPKC is used to encrypt and/or sign data during an online transaction. Depending on security requirements of a particular system, certain encryption and/or signature operations described above may be omitted. According to other embodiments, IDPKC-based secure transaction procedures described above may be applied to offline transactions. For example, the IDPKC-based secure transaction procedures may be applied to a case where a merchant performs basic checking, such as checking a cardholder's signature to avoid accepting a fake credit card, and later submits the data for authorization and clearing. Furthermore, the above-described embodiments may be used for in-store purchases, by replacing traditional credit card terminal payments with electronic devices compatible with the IDPKC-based protocols described above.

In a method of conducting a secure transaction in the electronic payment system, the electronic payment system may receive security information including a private key of a cardholder from a KMS, encrypt PI by using a public key of a payment gateway, encrypt OI by using a public key of a merchant, produce a dual signature of the encrypted PI and the encrypted OI by using the private key, transmit, to the merchant, a transaction request including dual-signed PI and OI, and receive a response to the transaction request from the merchant.

The merchant device 202 may receive a transaction request including a dual signature of encrypted PI and encrypted OI that are encrypted according to the IDPKC protocol, and may decrypt the OI by using a merchant private key according to the IDPKC protocol. The merchant device 202 may also transmit an authorization request to a payment gateway, the authorization request including the received encrypted PI and encrypted transaction information, receive an authorization response, and then determine whether to complete the requested transaction based on the received authorization response. The received encrypted payment information may include a payment amount to be authorized.

The merchant device 202 may also obtain transaction information including the payment amount to be authorized from the received OI. The merchant device 202 may encrypt the transaction information with a public key of the payment gateway and sign the encrypted PI, according to the IDPKC protocol. The merchant device 202 may generate an authorization request including the signed encrypted transaction information and the received encrypted PI, and may transmit the generated authorization request to the payment gateway.

When the merchant device 202 encrypts PI with the pubic key of the payment gateway, the merchant device 202 may encrypt the transaction information by using a fourth symmetric key, and may encrypt the fourth symmetric key by using the public key of the payment gateway according to the IDPKC protocol. The encrypted fourth symmetric key may be included in the authorization request.

The payment gateway 203 may receive an authorization request including encrypted PI and encrypted transaction information. The payment gateway 203 may also decrypt the PI and the transaction information using a private key of the payment gateway 203 according to the IDPKC protocol, and may communicate with an account holding entity identified by the PI to check whether the payment amount indicated by the transaction information can be authorized. The payment gateway 203 may encrypt an authorization response by using the public key of the merchant according to the IDPKC protocol, the authorization response including information about whether or not payment has been authorized, and may transmit the encrypted authorization response to the merchant.

The merchant device 202 that processes a secure transaction in the electronic payment system may include non-transitory computer-readable storage configured to store computer program instructions. The merchant device 202 may also include one or more processors configured to execute the stored computer program instructions, wherein the stored computer program instructions are configured to cause the cardholder device to: receive a transaction request including a dual signature of encrypted PI and encrypted OI, where the PI and the OI are encrypted according to the IDPKC protocol; decrypt the OI by using a merchant private key, according to the IDPKC protocol; transmit an authorization request to a payment gateway, the authorization request including the received encrypted PI and encrypted transaction information; receive an authorization response; and determine whether to complete the requested transaction based on the received authorization response.

The payment gateway 203 that processes a secure transaction in the electronic payment system may include non-transitory computer-readable storage configured to store computer program instructions. The payment gateway 203 may further include one or more processors configured to execute the stored computer program instructions, wherein the stored computer program instructions are configured to cause the cardholder device to: receive an authorization request including encrypted PI and encrypted transaction information; decrypt the PI and the transaction information by using a payment gateway private key, according to the IDPKC protocol; communicate with an account holding entity identified by the PI to check whether a payment amount indicated by the transaction information may be authorized; encrypt an authorization response by using a public key of a merchant according to the IDPKC protocol, the authorization response indicating whether or not the payment has been authorized; and transmit the encrypted authorization response to the merchant.

A KMS that provides a private key in the electronic payment system may include non-transitory computer-readable storage configured to store computer program instructions. The KMS may further include one or more processors configured to execute the stored computer program instructions, wherein the stored computer program instructions are configured to cause the cardholder device to: receive a registration request including a public identifier of the cardholder, and a symmetric key; generate a private key linked to the public identifier of the cardholder, according to the IDPKC protocol; encrypt the private key with the symmetric key; and transmit security information including the encrypted private key.

The electronic payment system may include the cardholder device 201, the merchant device 202, the payment gateway 203, the issuer's KMS 221, and the acquirer's KMS 222.

Some embodiments may also be embodied as a storage medium including instruction codes executable by a computer such as a program module executed by the computer. A computer readable medium can be any available medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal, or other transmission mechanism, and includes any information transmission medium.

Although the embodiments of the present disclosure have been disclosed for illustrative purposes, those of ordinary skill in the art will appreciate that diverse variations and modifications are possible, without departing from the spirit and scope of the disclosure. Thus, the above embodiments should be understood not to be restrictive but to be illustrative, in all aspects. For example, respective elements described in an integrated form may be dividedly used, and the divided elements may be used in a state of being combined.

While one or more embodiments have been described with reference to the figures, it will be understood by those of ordinary skill in the art that various changes in form and details may be made therein without departing from the spirit and scope as defined by the following claims.

The invention claimed is:

1. An electronic payment method performed by an electronic device, the electronic payment method comprising:
   encrypting a registration request to register a card of a user by using a first symmetric key;
   encrypting, based on Identity-based public key cryptography (IDPKC), the first symmetric key by using a public key of a key management service (KMS) server that stores personal information of the user;
   transmitting the encrypted registration request and transmitting the encrypted first symmetric key, to the KMS server to register the card;
   based on the registering of the card, receiving, from the KMS server, a private key of the user that is generated based on the IDPKC;
   encrypting payment information by using a public key of a payment device that is generated based on the IDPKC;
   encrypting order information by using a public key of a seller device that is generated based on the IDPKC;
   producing, based on the IDPKC, a dual signature of the encrypted payment information and the encrypted order information by using the private key;
   transmitting a transaction request comprising the dual-signed payment information and the dual-signed order information to the seller device; and
   receiving a response to the transaction request from the seller device.

2. The electronic payment method of claim 1, wherein the receiving the private key further comprises:
   receiving a KMS server certificate from the KMS server;
   authenticating the KMS server by using the KMS server certificate; and
   receiving the private key from the authenticated KMS server, and
   wherein the KMS server certificate comprises at least one of a master public key of the KMS server, a unique resource identifier (URI) of the KMS server, or a validity period of the master public key.

3. The electronic payment method of claim 1, further comprising:
   prior to the encrypting the registration request, generating the registration request to include an identifier of the card.

4. The electronic payment method of claim 1, wherein the encrypting the first symmetric key further comprises:
   receiving one or more KMS server public keys respectively corresponding to one or more KMS servers that include the KMS server;
   storing the one or more KMS server public keys in a memory;
   receiving an identifier of a KMS server that is used by the seller device among the one or more KMS servers;
   identifying a KMS server public key corresponding to the identifier of the KMS server among the one or more KMS server public keys by searching the memory; and
   encrypting the first symmetric key by using the identified KMS server public key based on the IDPKC.

5. The electronic payment method of claim 1, wherein the transmitting the encrypted registration request to the KMS server further comprises:
   receiving, from the KMS server in response to the transmitted registration request, a request for additional registration information signed by the KMS server;
   determining whether the request for the additional registration information is authentic by verifying a signature of the KMS server;
   based on the determining that the request for the additional registration information is authentic, encrypting the additional registration information by using a second symmetric key;
   encrypting, based on the IDPKC, the second symmetric key by using the public key of the KMS server; and
   transmitting the encrypted additional registration information and the encrypted second symmetric key to the KMS server.

6. The electronic payment method of claim 5, further comprising:
   generating a random number; and
   including the random number in one of the registration request or the additional registration information that are transmitted to the KMS server,
   wherein the random number is used to link an identifier of the card to an identifier of an account in which funds accessible via the card are stored.

7. The electronic payment method of claim 1, wherein the receiving the private key of the user further comprises at least one of:
   receiving a server signature that cryptographically links a public identifier of the user to an account identifier of an account associated with the card of the user;
   receiving a second random number generated by the KMS server and concatenated with a first random number generated by the electronic device, the public identifier of the user, and the account identifier, wherein the first random number is used to link an identifier of the card to the account identifier of the account in which funds accessible via the card are stored; or
   receiving a cache of one or more trusted server certificates.

8. The electronic payment method of claim 1, wherein the private key is cryptographically linked to a public identifier of the user and is then used to generate the dual signature of the encrypted payment information and the encrypted order information based on the IDPKC.

9. The electronic payment method of claim 1, wherein the producing the dual signature further comprises:
   generating the payment information and the order information;
   obtaining the public key of the payment device and the public key of the seller device based on a public identifier of the payment device and a public identifier of the seller device, respectively;
   encrypting, based on the IDPKC, the payment information by using the public key of the payment device; and
   encrypting, based on the IDPKC, the order information by using the public key of the seller device.

10. The electronic payment method of claim 9, wherein the encrypting the payment information with the public key of the payment device further comprises:
- encrypting the payment information and an account identifier of an account associated with the card of the user by using a second symmetric key; and
- encrypting, based on the IDPKC, the second symmetric key by using the public key of the payment device, and wherein the encrypted second symmetric key is included in the transaction request.

11. The electronic payment method of claim 9, wherein the obtaining the public key of the payment device and the public key of the seller device further comprises:
- transmitting an initialization request for initializing a secure transaction;
- receiving the public identifier of the payment device and the public identifier of the seller device;
- determining whether a format of the public identifier of the payment device and a format of the public identifier of the seller device match an expected format for a payment device identifier and an expected format for a seller device identifier, respectively; and
- obtaining the public key of the payment device and the public key of the seller device that correspond to the format of the public identifier of the payment device and the format of the public identifier of the seller device, respectively, that are determined to match the expected format for the payment device identifier and the expected format for the seller device identifier, respectively.

12. The electronic payment method of claim 1, wherein the receiving the response to the transaction request further comprises displaying the received response.

13. An electronic device comprising:
- a memory configured to store at least one instruction; and
- at least one processor, by executing the at least one instruction, is configured to perform a secure transaction within an electronic payment system by executing operations of:
  - encrypting a registration request to register a card of a user by using a first symmetric key;
  - encrypting, based on Identity-based public key cryptography (IDPKC), the first symmetric key by using a key management service (KMS) server public key of a KMS server that stores personal information of the user;
  - transmitting the encrypted registration request and transmitting the encrypted first symmetric key, to the KMS server to register the card;
  - based on the registering of the card, receiving, from the KMS server, a private key of the user that is generated based on the IDPKC;
  - encrypting payment information by using a public key of a payment device that is generated based on the IDPKC;
  - encrypting order information by using a public key of a seller device that is generated based on the IDPKC;
  - producing, based on the IDPKC, a dual signature of the encrypted payment information and the encrypted order information by using the private key;
  - transmitting a transaction request comprising the dual-signed payment information and the dual-signed order information to the seller device; and
  - receiving a response to the transaction request from the seller device.

14. The electronic device of claim 13, wherein the at least one processor, by executing the at least one instruction, is further configured to execute the operations of:
- receiving a KMS server certificate from the KMS server;
- authenticating the KMS server by using the KMS server certificate; and
- receiving the private key from the authenticated KMS server, and
wherein the KMS server certificate comprises at least one of a master public key of the KMS server, a unique resource identifier (URI) of the KMS server, or a validity period of the master public key.

15. The electronic device of claim 13, wherein the at least one processor, by executing the at least one instruction, is further configured to execute the operation of:
- generating the registration request to include an identifier of the card.

16. The electronic device of claim 13, wherein the at least one processor, by executing the at least one instruction, is further configured to execute the operations of:
- receiving one or more KMS server public keys respectively corresponding to one or more KMS servers that include the KMS server,
- storing the one or more KMS server public keys in the memory;
- receiving an identifier of a KMS server that is used by the seller device among the one or more KMS servers;
- identifying a KMS server public key corresponding to the identifier of the KMS server among the one or more KMS server public keys by searching the memory; and
- encrypting, based on the IDPKC, the first symmetric key by using the identified KMS server public key.

17. The electronic device of claim 13, wherein the at least one processor, by executing the at least one instruction, is further configured to execute the operations of:
- receiving, from the KMS server in response to the transmitted registration request, a request for additional registration information signed by the KMS server;
- determining whether the request for the additional registration information is authentic by verifying a signature of the KMS server;
- based on the determining that the request for the additional registration information is authentic the additional registration information by using a second symmetric key;
- encrypting, based on the IDPKC, the second symmetric key by using the public key of the KMS server; and
- transmitting the encrypted additional registration information and the encrypted second symmetric key to the KMS server.

18. The electronic device of claim 13, wherein the private key is cryptographically linked to a public identifier of the user and is then used to generate the dual signature of the encrypted payment information and the encrypted order information based on the IDPKC.

19. The electronic device of claim 13, further comprising a display configured to display the received response.

20. A computer program product comprising one or more computer readable storage media having programs stored therein, which, when executed by an electronic device, cause the electronic device to:
- encrypt a registration request to register a card of a user by using a first symmetric key;
- encrypt, based on Identity-based public key cryptography (IDPKC), the first symmetric key by using a public key of a key management service (KMS) server that stores personal information of the user;

transmit the encrypted registration request and transmit the encrypted first symmetric key, to the KMS server to register the card;
based on the registering of the card, receive, from the KMS server, a private key of the user that is generated based on the IDPKC;
encrypt payment information by using a public key of a payment device that is generated based on the IDPKC;
encrypt order information by using a public key of a seller device being generated based on the IDPKC;
produce, based on the IDPKC, a dual signature of the encrypted payment information and the encrypted order information by using the private key;
transmit a transaction request comprising the dual-signed payment information and the dual-signed order information to the seller device; and
receive a response to the transaction request from the seller device.

* * * * *